March 19, 1929.          C. LAMB ET AL          1,706,031
DOUBLE CROSS EXPANSION PACKING Filed Sept. 15, 1925

INVENTORS:
CHARLES LAMB,
DOUGLAS R. RADFORD,
BY
ATTORNEY.

Patented Mar. 19, 1929.

1,706,031

UNITED STATES PATENT OFFICE.

CHARLES LAMB AND DOUGLAS R. RADFORD, OF LOS ANGELES, CALIFORNIA, ASSIGNORS, BY MESNE ASSIGNMENTS, TO CHARLES LAMB, OF LOS ANGELES, CALIFORNIA.

DOUBLE CROSS-EXPANSION PACKING.

Application filed September 15, 1925. Serial No. 56,467.

Our invention relates to a piston rod or stuffing box packing having certain novel features of construction and advantages which will be pointed out hereinafter.

It has long been the practice to provide packing of rectangular cross section consisting of alternate layers of rubber and fabric vulcanized together, which layers are disposed on diagonals since it is found that such a packing expands readily. Opposite corners of the packing strips terminate in short layers which are easily separated or frayed by the friction of the moving member passing through the stuffing box in which the packing is used, resulting in a leakage of the stuffing box and a destruction of the packing.

It is an object of this invention to provide a packing having a protective covering for preventing the short layers of the packing from being separated from the body of the packing.

It has been found that such packing will not expand evenly or entirely satisfactorily if the layers of adjacent packing strips in a stuffing box are arranged parallel, but will expand evenly and very satisfactorily if the adjacent packing strips are arranged so that the layers thereof extend in crossing directions. The packing strips are generally saturated with heavy oil and covered with graphite, making them quite mussy to handle. For this reason the average workman is reluctant to examine the strips closely when placing them in a stuffing box and therefore the packing strips are not always placed so that the layers of adjacent packing strips are arranged in crossing directions.

It is an object of this invention to provide a package which will expand evenly.

It is a further object of this invention to provide a packing which cannot be installed improperly in a stuffing box.

It is a still further object of this invention to provide a packing consisting of a pair of packing strips disposed so that the layers of one cross the direction of the layers of the other, and a covering for protecting the short layers of the strips and for holding the strips in proper relative positions.

Other objects and advantages of this invention will be made manifest hereinafter.

Referring to the drawing which is for illustrative purposes only, and in which we show a preferred embodiment of our invention, Fig. 1 is a view illustrating the packing of our invention in use.

Figure 1:
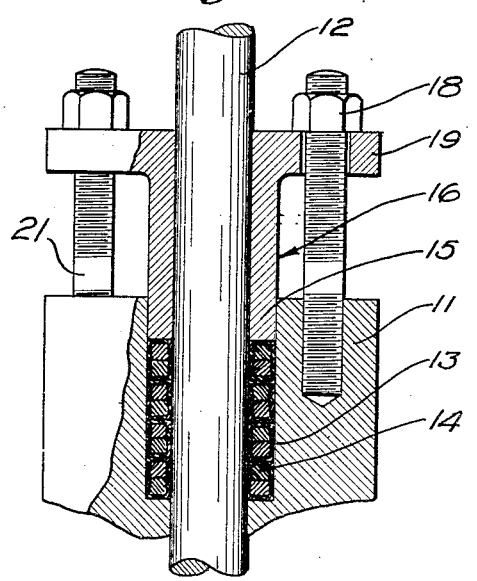

With reference to Fig. 1, 11 represents a wall through which a shaft 12 is extended. The shaft 12 extends through a box 13 in which packing 14 of our invention is placed. A cylindrical extension 15 of a gland 16 enters the outer part of the box 13 and is caused to compress the packing 14 by means of nuts 18 which engage flanges 19 of the gland 16 in a manner to force the gland into the box 13 when these nuts 18 are advanced downward on studs 21 secured to the body 11.

Figure 2:
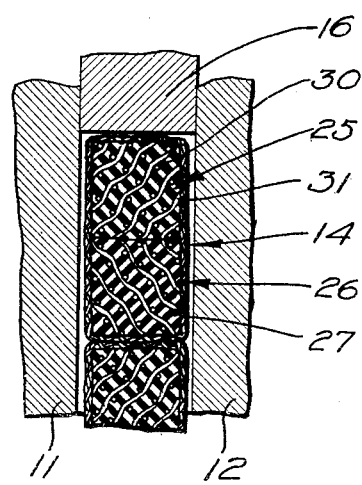
Fig. 2 is an enlarged fragmentary section showing the packing of our invention previous to the expansion thereof.
Figure 3:
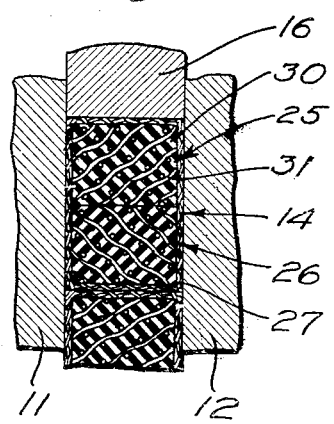
Fig. 3 is a view similar to Fig. 2 but showing the packing when it is expanded.
Figure 4:
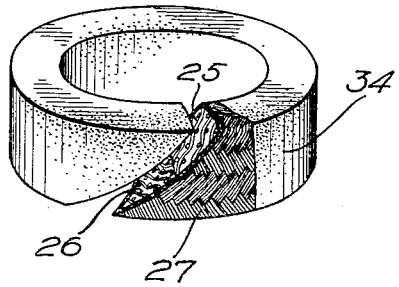
Fig. 4 is a perspective view showing a ring of packing of our invention.

As clearly shown in Figs. 2, 3 and 4, the packing 14 of our invention consists of a primary strip 25, a secondary strip 26 and a protective covering 27. The primary and secondary strips 25 and 26 consist of alternate layers of rubber 30 and fabric 31, the fabric 31 being preferably canvas and the texture thereof being cut on a bias. As shown in Figs. 2, 3 and 4, the layers of rubber 30 and fabric 31 are diagonally arranged and do not extend parallel to any of the outer faces of the strips 25 or 26. The layers of rubber and canvas 30 and 31 are preferably attached together, as by vulcanizing.

The strips 25 and 26 of the packing member 14 are placed together so that adjacent faces contact each other and so that the layers of one strip extend at substantially right angles to the layers of the other strip; that is, so that the layers of one extend in directions to cross the layers of the other strip.

Extending around and enclosing the strips 25 and 26 is the protective covering 27. This protective covering 27, as shown in Fig. 4, is preferably of a braided texture. The covering holds the strips 25 and 26 tightly together and retains them in their proper positions; that is, in such positions that the layers of one cross the layers of the other. The protective covering 27 also protects the short layers of the members 25 and 26 from the friction of the shaft 12 and prevents their being separated or frayed from the joints of the strips 25 or 26. The packing 14 is immersed in lubricating oil, which is usually heated 600 W., until it is thoroughly saturated, after which it is tumbled in flake graphite, giving it a graphite coating as indicated at 34 in Fig. 4.

In Fig. 2 we show the packing of our invention before it has been compressed and expanded by the gland 16, and in Fig. 3 we show a packing after it has been expanded by the gland 16. From Fig. 3 it will be seen that the packing of our invention expands evenly and this is due to the fact that the layers are diagonally arranged and mainly because layers of adjacent packing strips of the packing are disposed in crossing directions. In Fig. 3 the inner wall of the protective covering 27 is shown in engagement with the shaft 12; therefore, the covering 27 receives all of the friction, none of the friction being given to the short layers of the strips 25 and 26. By relieving these short layers of friction, the tendency of these layers to be separated from the strips is minimized and the life of the packing will be very much longer than that of ordinary packing. When the inner wall of the protective covering 27 has been worn away friction of the shaft 12 is applied to the edges of the layers of the strips 25 and 26. At this time the packing of our invention will be in the same condition as the ordinary type of packing when it is first placed in a stuffing box and it will have a life after it has been worn to this extent, which is equal to that of the entire life of an ordinary packing which has been properly placed.

From the foregoing description it will be seen that our invention is so constructed that the adjacent strips of packing can be placed only in a proper manner in a stuffing box and therefore the packing will expand evenly and satisfactorily so that there will be no leakage of the stuffing box. This feature of our invention is accomplished by providing a packing which consists of a pair of packing strips which are held together in proper position by the protective cover 27. Another important feature of our invention is the protecting of the short layers of the strips 25 and 26, which protecting is effected by the protecting cover 27.

We claim as our invention:

In a packing of the class described adapted to be compressed upon an axis thereof, the combination of: primary and secondary strips each consisting of layers of material diagonally arranged, the layers of said primary strip being disposed in crossing direction relative to the layers of said secondary strip, the layers of both of said strips being disposed obliquely relative to said axis of compression, ends of said layers in both strips terminating at the faces of the strips which are juxtaposed relative to each other.

In testimony whereof, we have hereunto set our hands at Los Angeles, California, this 9th day of September, 1925.

CHARLES LAMB.
DOUGLAS R. RADFORD.